BEST AVAILABLE COPY

H. GALE,

Assignor, by mesne assignments, to THE GALE MANUFACTURING CO.

Plow.

No. 8,082. Reissued Feb. 12, 1878.

Attest:
R. T. Dyer.
L. N. Seely.

Inventor:
Horatio Gale.
by Geo. W. Myers & Co
Attys.

N. PETERS, PHOTO-LITHOGRAPHER, WASHINGTON, D. C.

UNITED STATES PATENT OFFICE.

HORATIO GALE, OF ALBION, MICH., ASSIGNOR, BY MESNE ASSIGNMENTS, TO THE GALE MANUFACTURING COMPANY, OF SAME PLACE.

IMPROVEMENT IN PLOWS.

Specification forming part of Letters Patent No. 107,033, dated September 6, 1870; Reissue No. 8,082, dated February 12, 1878; application filed December 8, 1877.

*To all whom it may concern:*

Be it known that I, HORATIO GALE, of Albion, in the county of Calhoun and State of Michigan, have invented an Improvement in Plows, of which the following is a specification:

The nature of my invention relates to certain new and useful improvements in plows which are provided with a smaller plow, attached to the same beam, and in front of the larger plow, which turns the deeper furrow; and the invention consists in combining with the plow-beam and jointer-standard a laterally-slotted hanger-plate, secured to said standard by means of a bolt. By means of this slotted plate, adjustable by means of the bolts by which it is secured to the under face of the beam, the small plow attached to its standard is laterally adjustable, so that it may be easily placed in exact alignment and parallelism with the larger plow, and so that their mold-board lines and land-side faces may be readily adjusted to a true, equal, and parallel correspondence with each other.

The invention further consists in combining with said standard and adjusting-plate a fast and loose serrated disk, by means of which the point of the small plow may be elevated or depressed, as desired, controlling the pitch of the small plow.

My invention is embodied in the accompanying perspective drawing, in which—

Figure 1:
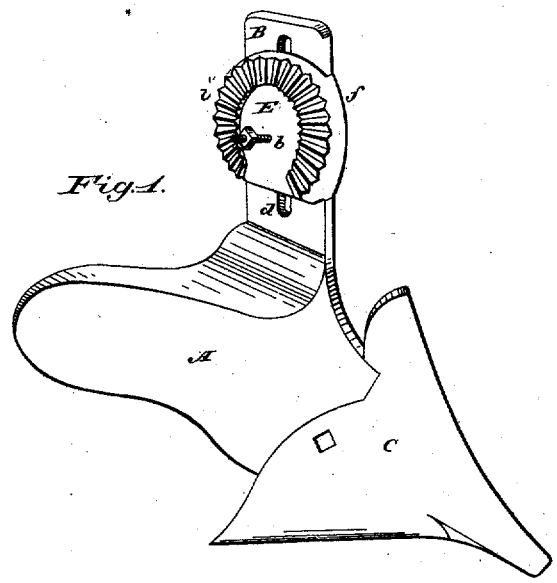
Figure 2:
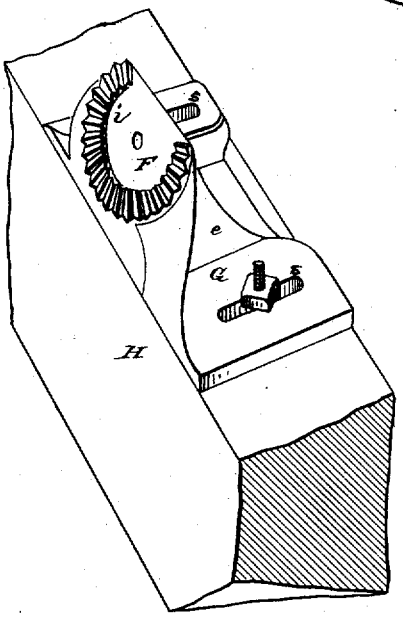

Figure 1 represents the small surface or jointer plow detached, with the loose adjustable serrated disk in place against the standard. Fig. 2 exhibits the adjusting hanger-plate carrying the fast disk, bolted to a broken section of the beam, placed in an inverted position, to show the adjusting-slots in the plate.

In the drawings, A represents the mold-board, to which is cast the short standard B, slotted to receive the bolt *b*, and also the land-side, (not shown,) and C exhibits the share, bolted on in the usual way, all constituting the small leading or jointer plow.

Inasmuch as the slotted standard is adjustably secured, in my arrangement, to pendent disks below the under level of the beam, such standard may be much shorter than when fastened to the side of the beam in the common way.

E is a loose adjusting-disk, which lies against the slotted plow-standard B, and is furnished with two side flanges, (one of which is seen at *f*,) which overlap the edges of the standard, and serve as guides. F is the fast disk, cast or rigidly secured onto, and at a right angle with, the hanger-plate G, said disk being usually strengthened by angle-ribs *e e*, and the plate is provided with two lateral slots, S S, through which the bolts pass, that bolt it adjustably to the under side of the beam H.

Each disk is provided with matched serrations *i* on its face, next the periphery, so that the two may interlock firmly together, and with a central bolt-hole, to admit the bolt *b*, which passes through the slot *a* in the plow-standard, and bolts the whole firmly together.

To adjust the plow for any required depth of furrow, its standard is raised or lowered within the space between the guides of the adjusting-disk E, such adjustment being controlled by the bolt *b* passing through the slot *h* in the standard. To change the longitudinal pitch or angle, the plow and disk E are drawn back to disengage the serrations; and the plow rocked or rotated in either direction, when the teeth will engage in new places; and to adjust the draft-lines of the small plow to a proper correspondence with the large one, the hanger-plate G and connected plow are moved laterally or twisted around on the beam, for which important adjustment the bolt-slots S are specially provided.

The common mode of fastening the standards of these plows to the side of the beam by a gripe permits a somewhat insecure adjustment as to height and pitch, and a lateral adjustment can only be made by cutting away the beam, or by interposed packing, frequently wedge-shaped, all to be done in the field where the plowing is going on, and such mode of adjustment must necessarily be very annoying in practice and very uncertain in result, and there is no known mode of determining the relations which two plows, working in one furrow, should bear to each other under varying conditions, except by actual experimental use.

My improvement not only enables the last-named adjustment to be made in a very ready and exact manner, but facilitates and makes secure all the rest, shortens the plow-standard, and forms a compact, complete, and reliable means of adjustable attachment.

What I claim as my invention is—

1. In a plow, the combination, with the beam, of a plate, G, on the under side of the beam, provided with lateral slots S S and suitable bolts, for adjustably securing the said plate to the beam, whereby the alignment of the mold-board and land-side faces of the jointer or small plow, placed in advance of the main plow, may be readily adjusted to a true, equal, and parallel correspondence with said main plow, substantially as described.

2. In a plow, an adjusting-plate, G, secured to the under side of a plow-beam, in combination with a standard, B, carrying a small plow, and secured to said plate by a bolt, for the purpose of aligning the land-side of the small plow with the main plow, and at the same time adjusting the pitch of the small plow, thereby securing for said small plow both a lateral and vertical adjustment, substantially as set forth.

3. The small plow, having slotted standard B, the bolt *b*, and the adjusting-plate G, in combination with the main plow and beam, for the purpose of a vertical adjustment of the small plow to control the depth of the furrow, substantially as herein set forth.

4. In combination with the main plow and beam, the small plow, the slotted standard B, and adjusting-plate G, and the fast and loose serrated disks E F, substantially as herein set forth.

HORATIO GALE.

Witnesses:
C. C. LANE,
A. J. GALE.